US005385512A

United States Patent [19]

Moolenaar et al.

[11] Patent Number: 5,385,512

[45] Date of Patent: Jan. 31, 1995

[54] TRANSMISSION FOR ELECTRICALLY DRIVEN TOOL

[75] Inventors: Antony J. Moolenaar, Dorst; Jan P. Houben; Jacobus F. Geerts, both of Breda, all of Netherlands

[73] Assignee: Emerson Electric Co., Breda, Netherlands

[21] Appl. No.: 922,828

[22] Filed: Jul. 31, 1992

[30] Foreign Application Priority Data

Aug. 2, 1991 [NL] Netherlands .......................... 9101335

[51] Int. Cl.$^{6}$ ................................................ F16H 1/28

[52] U.S. Cl. ...................................... 475/153; 173/176

[58] Field of Search .......................... 81/467, 469, 470; 173/176, 181, 182; 475/149, 153

[56] References Cited

U.S. PATENT DOCUMENTS 3,993,145 11/1976 Findeli .......................... 173/176 OR
4,108,252 8/1978 Stroezel ........................ 173/176 OR
4,554,980 11/1985 Doniwa ........................ 173/176 OR
4,712,456 12/1987 Yuan ..................................... 81/473
4,892,013 1/1990 Satoh ............................... 173/178 X
4,898,249 2/1990 Ohmori ......................... 173/176 OR
4,991,473 2/1991 Gotman ............................ 81/467 X

FOREIGN PATENT DOCUMENTS 2396626 2/1979 France .

*Primary Examiner*—Dirk Wright
*Attorney, Agent, or Firm*—Jones, Day, Reavis & Pogue

[57] ABSTRACT

Transmission between electric motor and tool shaft, for instance for hand tools such as an electric screwdriver and the like, which transmission is provided with an adjustable breaking coupling for discontinuing the drive torque on the tool shaft when a predetermined resistance moment on this tool shaft is exceeded, wherein the breaking coupling in the form of two mutually slidable parts is provided with a signal generator for controlling a member influencing the motor feed, which signal generator comes into operation as soon as the two parts slide relative to one another when the set torque is exceeded, so that a disengagement takes place between motor and tool shaft immediately after the desired resistance moment is exceeded, wherein the inertia of the rotating parts no longer has any effect on the tool shaft so that it stops immediately.

10 Claims, 3 Drawing Sheets

TRANSMISSION FOR ELECTRICALLY DRIVEN TOOL

CROSS REFERENCE TO RELATED APPLICATIONS

This application claims the priority of Dutch Application No. 9101335 filed Aug. 2, 1991 under 35 U.S.C. § 119.

BACKGROUND OF THE INVENTION

The invention relates to a transmission between an electric motor and a tool shaft, for instance for hand tools such as an electric screwdriver and the like, which transmission is provided with an adjustable breaking coupling for discontinuing the drive torque on the tool shaft when a predetermined resistance moment on this tool shaft is exceeded.

In electric tools, particularly electric hand tools, it is known to place a slip or claw coupling between the electric motor and the tool shaft, whereby in the case of overload the tool shaft is no longer subjected to the full torque of the electric motor. The drawback to such a system is that when the motor is driven, a torque is still exerted continuously or intermittently on the tool shaft. This can be disadvantageous in particular applications. In addition, such couplings are noisy and greatly subject to wear.

There also exist protection circuits which cause the motor feed to be switched off and/or braked as soon as overload of the motor occurs. Such a switch-off system is difficult to embody particularly in conjunction with battery-powered DC-motors because the high amperages could present adverse consequences during switch-off upon overload. Moreover, the mass inertia of the rotating parts continues to act on the tool shaft during switch-off.

The object of the invention is to provide a transmission wherein a disengagement takes place between motor and tool shaft immediately after the desired resistance moment is exceeded, wherein the inertia of the rotating parts no longer has any effect on the tool shaft so that it stops immediately.

SUMMARY OF THE INVENTION

The transmission according to the invention is distinguished in that the breaking coupling in the form of two mutually slidable parts is provided with a signal generator for operating a member influencing the motor feed, which signal generator comes into operation as soon as the two parts slide relative to one another when the adjusted torque is exceeded.

Sliding of the two parts can be detected by a sensor, such as signal generator for example. It is likewise possible to convert the sliding movement into an operating movement for a switch.

The member that influences the motor feed can also be a system for reversing the polarity or short-circuiting of the motor feed so that the motor can be stopped rapidly.

In a transmission provided with a single or multi-stage gear wheel drive, the invention is an attempt to accommodate the breaking coupling in a stage of the drive.

In the preferred embodiment, the breaking coupling is embodied as a claw coupling with axially slidable parts under an axial spring bias. Due to the claw coupling, which is preferably provided with one or more pairs of protrusions distributed regularly along the periphery, a determined angular rotation is possible between the parts without the claw coupling again being in active engagement. Thus, the inertia of the rotating parts on the sides of the electric motor no longer has any influence on the stopping of the motor shaft which can therefore be stopped immediately.

The spring bias on the parts of the claw coupling preferably acts on the claw coupling via a lever system whereby the a range of breaking torques may be set by the adjustment means.

It is recommended herein to cause the pressure point of the spring on each lever to be displaceable relative to the lever so that a relatively large adjustment range of the spring bias on the claw coupling is possible while retaining a fixed spring setting.

In the present case, use is made in the transmission of a planetary gear wheel drive which is provided with an outer sleeve along the internal teeth of which the planet wheels roll. The invention then proposes to embody the outer sleeve as the one part of the breaking coupling. This offers the advantage that, because the outer sleeve is stationary during normal operation, the claw coupling also does not rotate. As soon as the claw coupling disengages, the sleeve will rotate and cause the drive to stop via the planet wheels. This results in direct stoppage of the tool shaft wherein virtually no lagging torque occurs due to inertia of the rotating parts.

The invention will be further described in the detailed description of an embodiment which is shown in the accompanying drawings.

DESCRIPTION OF THE PREFERRED EMBODIMENT

Figure 1:
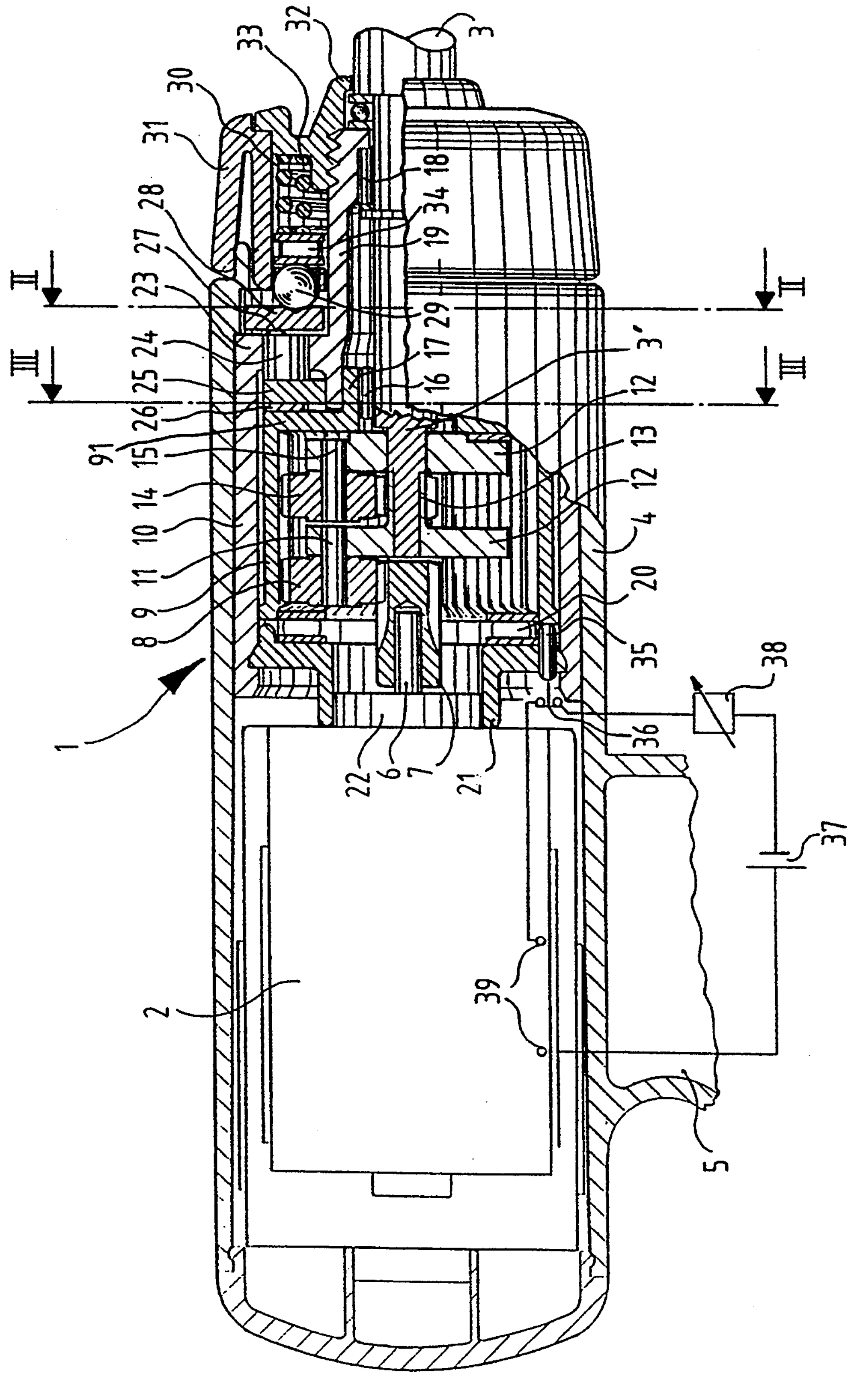
FIG. 1 shows a longitudinal section of a part of a hand tool provide with electric motor, transmission and tool shaft.

FIG. 1 shows an electric hand tool with the transmission 1 of the present invention in its entirety. The transmission 1 is received between an electric motor 2 and a tool shaft 3. These components may be directly mounted in a housing 4 which can be of any suitable construction. The housing 4 is provided with a handgrip 5 (partially shown), to facilitate hand use. A motor shaft 6 is connected to a rear wheel shaft 7 which co-acts with a planetary gear wheel 8 which rolls on internal teeth of a sleeve 9 which is rotatably mounted in a cylindrical sub-housing 10.

The planetary gear wheel 8 is rotatably mounted on a first rotation shaft 11 which is fixed to a freely rotating first disc 12. The disc 12 is centrally mounted on a shank of the tool shaft 3. A toothed portion 13 of a reduced-in-diameter shank of the tool shaft 3 interconnects disc 12 to a second disc 12' which is also centrally mounted on the shank of tool shaft 3. The toothed shaft 13 co-acts with a second planetary gear wheel 14 which likewise rolls on the same internal teeth of the sleeve 9. The planetary gear wheel 14 is rotatably mounted on a second rotation shaft 15 which is fixed to the second freely rotating disc 12'. As planetary gear wheels 8 and 14 roll around the internal teeth of sleeve 9, rotation shafts 11 and 15 impart rotational movement to discs 12 and 12'. Discs 12 and 12' transfer this movement to tool shaft 3. The shank of tool shaft 3 is rotatably supported by a first set of roller bearings 16 in a bearing collar 17 of sleeve 9, and a second roller bearings 18 received between the tool shaft 3 and a bearing casing 19 of the cylindrical sub-housing 10.

The transmission 1 is supported in the axial direction by roller bearings 20 which have a supporting surface with an annular end flange 21 which is fixed on an open end of the cylindrical sub-housing 10. A part 22 of the motor 2 which protrudes into the sub-housing 10 is supported by the annular flange 21.

An end wall 23 of sub-housing 10 is oriented perpendicularly to the shaft and the bearing sleeve 19. The wall 32 has a number of openings each receiving a freely movable pin 24. The pins 24, of which there are three in the preferred embodiment as shown in FIGS. 2*a* or *b*, are fixedly attached to a stationary ring 25 extending around the bearing 16.

Protrusions 26*a* (FIG. 3) are fixed to the forward end surface 91 of the outer sleeve 9. Protrusions 26*b* are fixed to the surface of the ring 25 opposite of surface 91. Together protrusions 26*a* and 26*b* comprise a claw coupling 26. The preferred position of protrusions 26*a* and 26*b* are shown in FIG. 3. During operation protrusions 26*b*, which are fixed to the stationary ring 25, engage protrusions 26*a* to prevent the rotatably mounted sleeve 9 from rotating in response to the rotation of the planetary gear wheels 8 and 14. A head end of each pin 24 remote from the ring 25 is provided with a pressure nose 27 which is in contact with an arcuate plate 28, (see FIGS. 2*a* and *b*,) the action of which will be explained hereinbelow.

Each arcuate plate 28 is pressed at one end 41 thereof against the nose 27 of the pin 24 by means of a ball 29. Three of the balls 29 are likewise arranged in suitable openings in the inner wall 30 of a adjustment collar 31. The other end of the arcuate plate engages the end wall 23 (FIGS. 2*a* and *b*, respectively) and thereby forms a pivot point. The adjustment collar 31 is held in place by a nut 32 which can be screwed onto a thread of the bearing sleeve 19. A pressure spring 33 abuts an annular roller bearing 34 assembly and the inner surface of the closing nut 32. The spring 33 serves to urge the balls 29 into engagement with respective arcuate plates 28.

A pressure pin 35 is supported in an opening in flange 21 of the sub-housing 10. The forward end of the pin 35 is received in a recess (not shown) in the rear end surface of inner sleeve 9. The rear end of the pin 35 is connected to a switch 36 which is part of the power supply circuit of motor 2. The supply circuit is, for example, a voltage source 37, such as a battery, which is connected to the motor terminals 39 via a control circuit 38. The control circuit 38 can include any known suitable control for the rotational speed and rotational direction of the motor 2, as well as a power switch. The switch 36 serves respectively to break and close the current supply circuit for the motor 2, the function of which will be explained hereinafter.

The operation of the transmission as described above is as follows.

In normal use, when the motor 2 is energized, the motor shaft 6 will drive the planetary gear wheel transmission. The planet wheels 8 and 14 roll along the internal teeth of the sleeve 9, to transfer rotational movement via shafts 11 and 15 to discs 12 and 12', which in turn transfers the rotational movement to shank 3' of shaft 3. The revolution speed of the shaft 3 will be considerably less than the revolution speed of the motor shaft 6 due to momentum loss through the two-stage planetary drive.

As the tool shaft 3 encounters increased resistance to rotation, the motor 2 will continue to provide the same torque to shaft 6 and to gear wheels 8 and 14. This situation causes a torque disparity between the shaft 6 and shaft 3. Much of the torque lost between the shaft 6 and the shaft 3 is applied to the internal teeth of sleeve 9. This torque applied to the sleeve 9 urges sleeve 9 to rotate. However, rotation of sleeve 9 is prevented by the interengagement of protrusions 26*a* and 26*b*. When the torque resistance on the shaft 3 exceeds the predetermined torque resistance created by protrusions 26*a* and 26*b*, the force on each pair of the protrusions 26*a* and 26*b* becomes so great that the protrusions 26*a* slide over protrusions 26*b*. Hence, the sleeve 9 begins to rotate relative to the ring 25.

The rotation of the sleeve 9 causes the pressure pin 35 to be moved out of the recess axially toward the switch 36 which is normally in the closed position. The pin 35 opens the switch 36. The current to the motor 2 is thereby cut off and motor 2 comes to a stop.

As the motor 2 comes to a stop, inertia compels the shaft 6 and the planet wheels 8 and 14 to continue rotating. This rotation of movement is not transferred to the tool shaft 3 because the torque resistance on the shaft 3 exceeds the torque resistance created by protrusions 26*a* and 26*b*. Instead, as soon as the protrusions 26 have passed each, the tool shaft 3 comes to an immediate stop despite the phenomenon that the motor 2 is continuing to turn the planetary drive which rotates sleeve 9.

The pressure force exerted by the ring 25 against the wall 91 of the sleeve 9 is determined by the biasing spring 33. The spring 33 rests against the closing nut 32 and biases against the pivot bearing 34. In turn, the biasing force from spring 33 is distributed from bearing 34 to the balls 29 which press against the arcuate plates 28. One end 40 of the plate 28 rests directly against the head wall 23 of the sub-housing 10 thereby forming a pivot support, while the other end 41 rests against the nose 27 of pin 24. Through nose 27, the biasing force of the spring 33 is transferred to the pin 24. The biasing force that the spring 33 transfers to pin 24 is dependent on the radial position of the ball 29 in relation to the ends of the plate 28. The radial position of the ball 29 is adjusted by rotating the adjustment collar 31. If the collar 31 is rotated so that each ball 29 is in a position directly opposite the corresponding pin 24, the biasing force from spring 33 is transferred directly onto the pins 24 without lever action. If the collar 33 is rotated counterclockwise, as shown in FIGS. 2*a* and *b*, so the balls are adjusted to a radial position remote from the pins 24, the biasing force of spring 33 acts on pins 24 by a lever action whereby the end 40 of the arcuate plates 28 serves as a fulcrum against wall 23. By adjusting the radial position of the balls 29 relative to the pins 24, the biasing force transferred from spring 33 to pins 24 is proportionally reduced or increased, depending on the direction of rotation of the adjustment collar 31. The biasing force on the pins 24 is simply adjusted by turning the collar 31 without appreciably expanding or compressing the spring 33. The biasing force acting on the pins 24 and therefore on the protrusions 26a and 26b is adjustable over a wide range without changing the spring bias.

When all three pairs of protrusions 26a and 26b are placed at the same pitch diameter, upon disengagement protrusion 26a can rotate a maximum of 120° before the protrusions 26b will engage another protrusion 26a. The free degree of rotation of sleeve 9 is therefore limited to 120°, which may be inadequate in some applications. It may be desirable to enlarge the degree of rotation of sleeve 9 and to enable stopping a greater mass having increased inertia after switching off motor 2. Thus, it is recommended to place the co-acting protrusions 26a and 26b at different pitch diameters, see R1, R2 and R3 in FIG. 3. As shown in FIG. 3 the protrusions 26a can disengage by sliding past the protrusions 26b, and rotating 360° until the protrusions 26a and 26b engage again at the same pitch diameter.

It will also be apparent that within the scope of the invention a different drive is possible between motor and tool shaft, wherein use can be made of only one pair of protrusions 26a and 26b which operates a switch 36 at a position other than shown in FIG. 1 to switch off the power supply 37 to the motor 2. In addition the switch can also serve to reverse the polarity in the motor 2, whereby a rapid braking of the rotor of the motor can likewise be obtained.

Figure 4:
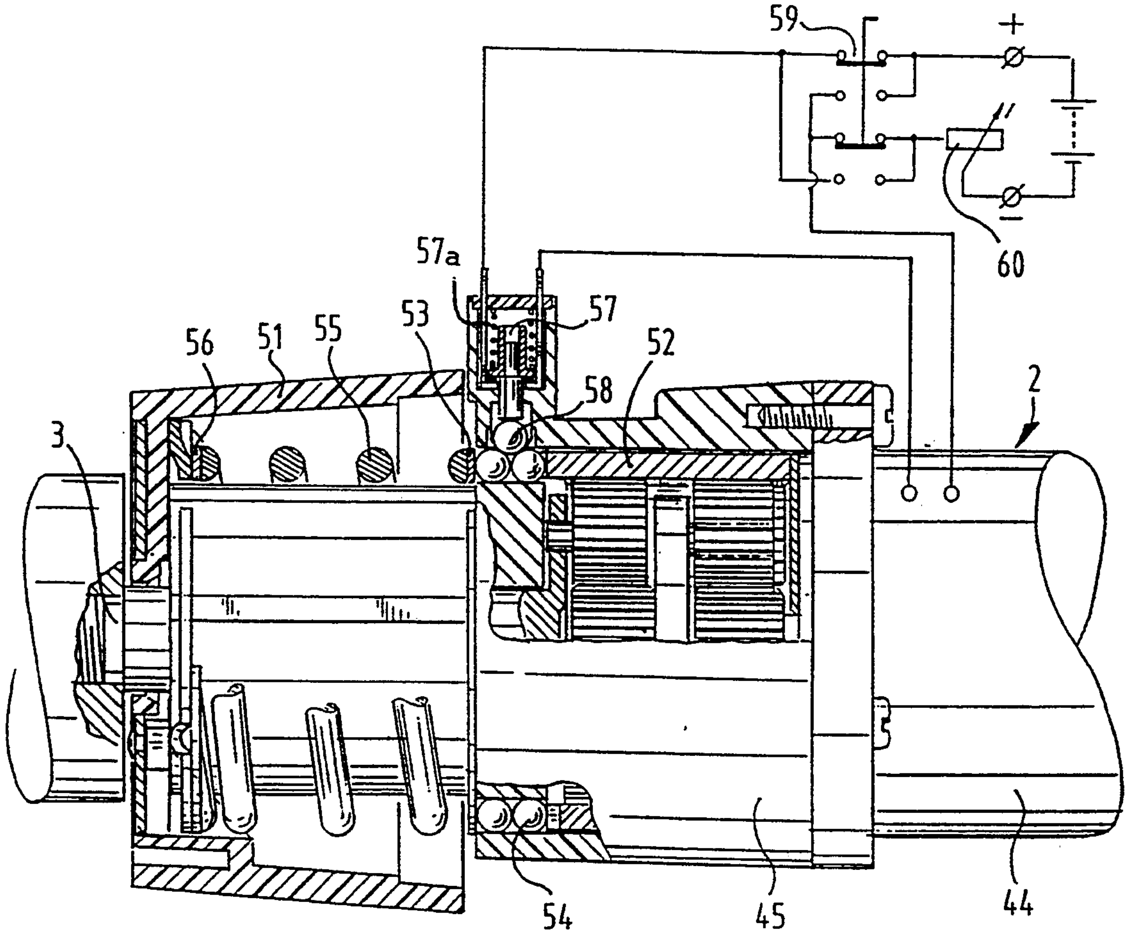
FIG. 4 a second embodiment of the invention corresponding wit 1.

A second embodiment of the present invention with an alternative power deactivator is shown in FIG. 4. The second embodiment is likewise provided with a breaking coupling as in the preferred embodiment. The engaging of the coupling triggers the power deactivation in a mechanical manner by the displacement of a ball.

In this second embodiment, the electric tool comprises a motor 44 connected to a transmission 45. The transmission 45 is embodied as a planetary gear system, such that a sleeve-like housing 52 thereof rotates when the coupling disengages. The housing 52 has two grooves on opposite sides thereof. A ring 53 is arranged adjacent to the housing 52 such that two rows of balls 54 are enclosed in the grooves of the housing 52 and the ring 53. A recess just large enough to receive less than half of a ball 54 is arranged in the head end sides of the housing 52 adjacent to the grooves which contain the row of balls. During normal operation one of balls 54 is disposed in the recess.

A force is exerted against the ring 53 by a helical spring 55 such that the ring 53 is biased toward the housing 52. The helical spring 55 is constrained on another side by a second ring 56, the position of which can be changed in axial direction by rotating an adjusting ring 51. By rotating the ring 51, the position of the second ring 56 is changed, thereby varying the force which the spring 55 exerts against the ring 53.

A microswitch 57 is arranged on the periphery of the rows of balls 54 to detect disengagement of the coupling. The microswitch 57 is connected between a battery and the motor 44, wherein a reverse polarity switch 59 and a revolution speed control means 60 are arranged in the form of an adjustable resistor. An electronic control can also be used instead of an adjustable resistor, to reduce the energy loss.

When the coupling disengages, the housing 52 commences rotation, thereby pushing the ball 54 in the recesses out of the recess closer to the other balls. Consequently, there will be less room for the extra ball 58, so the balls 54 will push the extra ball 58 counter to the bias of the spring 57a to activate the microswitch 57.

Figure 5:
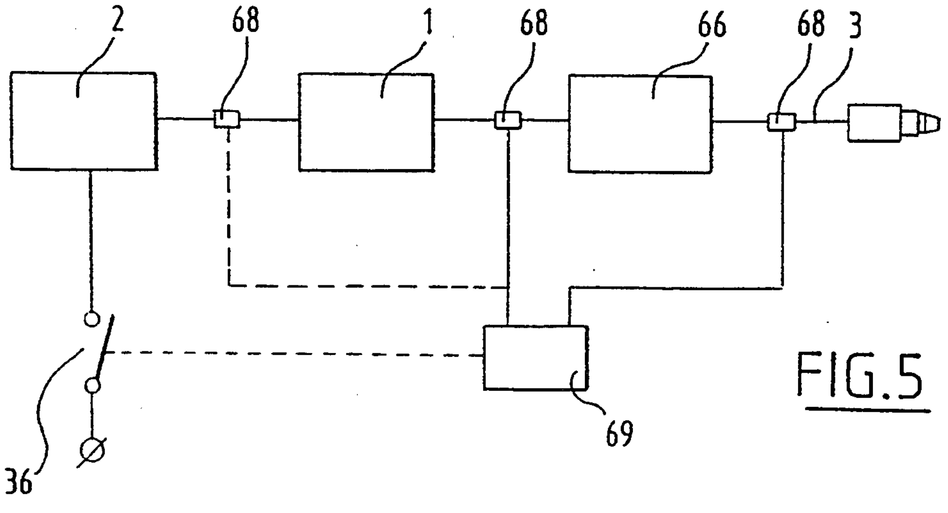
FIG. 5 shows a block diagram of a third embodiment.

In a third embodiment shown schematically in FIG. 5, the motor 2 drives the tool shaft 3 via a transmission 1 and a slip coupling 66. A revolution speed measuring means 68 is arranged between transmission 1 and slip coupling 66, and also between slip coupling 66 and shaft 3. Each revolution speed measuring means 68 measures the revolution speed in front of and behind the slip coupling 66 so that it can be determined whether the slip coupling 66 is slipping. The output terminals of both revolution speed measuring means 68 are therefore fed to a processing circuit 69. The processing circuit 69 determines whether the revolution speeds in front of and behind the slip coupling 66 differ, and therefore whether the motor 2 is exceeding a predetermined maximum torque. If the motor 2 does exceed the predetermined maximum torque, processing circuit 69 can discontinue power from power source 36 to the motor 2. The slip coupling is constructed such that it will disengage before the motor 2 and the other components of the machine overload.

Other configurations of protrusions are of course also possible within the scope of the invention.

We claim:

1. A transmission for an electrically powered tool which transmits power from an electric motor to a tool shaft, said transmission comprising:

(a) said tool shaft mounted within a housing;

(b) an adjustable breaking coupling having two mutually slidable parts which slide relative to one another to interrupt the drive torque on said tool shaft when said tool shaft encounters a predetermined resistance moment;

(c) a signal generator activated by movement of one of said parts to deenergize the motor when said parts slide relative to one another;

(d) compression spring means engaged with said breaking coupling for urging said two parts into engagement with each other; and (e) adjustment means including a lever system engaged with said spring means and said breaking coupling for modifying the amount of spring force acting on said breaking coupling and thereby adjusting said predetermined resistance moment without substantially expanding or compressing said spring means.

2. The transmission according to claim 1, wherein said adjustment means is further defined by:

(a) a plurality of levers generally disposed in a plane perpendicular to the axis of said tool shaft;

(b) means defining a fixed fulcrum for each of said levers;

(c) a plurality of pins equal in number to the number of said levers and engaged with respective levers and one of said parts of said breaking coupling;

(d) a plurality of adjustment elements equal in number to the number of said levers and engaged with respective levers and said spring means; and (e) means for moving said adjustment elements relative to said levers to vary the leverage exerted by said levers on said pins.

3. The transmission according to claim 2 wherein said compression spring means includes a compression spring mounted in an axial relationship with said tool shaft.

4. The transmission according to claim 2 wherein each of said adjustment elements comprises a ball.

5. The transmission according to claim 2 wherein said levers are of plate-like construction each being fulcrummed at one end thereof, said pins engaging the plate-like levers at their other ends.

6. The transmission according to claim 1 further defined by:

(a) a planetary gear system for transmitting power from said electric motor to said tool shaft; and (b) said planetary gear system including a cylinder with gear teeth on the interior thereof, said cylinder constituting said one of said parts of said breaking coupling.

7. The transmission according to claim 6 wherein said cylinder is normally stationary during the transmission of power but commences rotation upon movement relative to the other part of the breaking coupling, said signal generator having a movable sensory element, said cylinder including a formation engaged with said sensory element for actuating said signal generator upon rotation of the cylinder.

8. The transmission according to claim 2 further defined by:

(a) a cylinder constituting a part of a planetary gear system;

(b) said pins being supported by a ring member mounted adjacent to said cylinder in coaxial relationship therewith and in coaxial relationship with said tool shaft; and (c) said mutually slidable parts comprising a first protrusion mounted on one end of said cylinder and a second protrusion mounted on an adjacent face of said ring member, said protrusions normally being in detachable engagement with each other and sliding relative to each other when said tool shaft encounters a predetermined resistance moment.

9. The transmission according to claim 8 wherein plural sets of mating first and second protrusions are provided.

10. The transmission according to claim 9 wherein at least two sets of mating first and second protrusions are disposed at different radii from the axis of rotation of the tool shaft.

* * * * *

UNITED STATES PATENT OFFICE

CERTIFICATE OF CORRECTION

Patent No. 5,385,512 Dated January 31, 1995

Inventor(s) Antony J. Moolenaar et al.

It is certified that error appears in the above-identified patent and that said Letters Patent is hereby corrected as shown below:

Col. 2, line 44, after "FIG. 4", insert --shows--.

Col. 2, line 45, change "wit 1", to "with FIG. 1".

Figure 2:
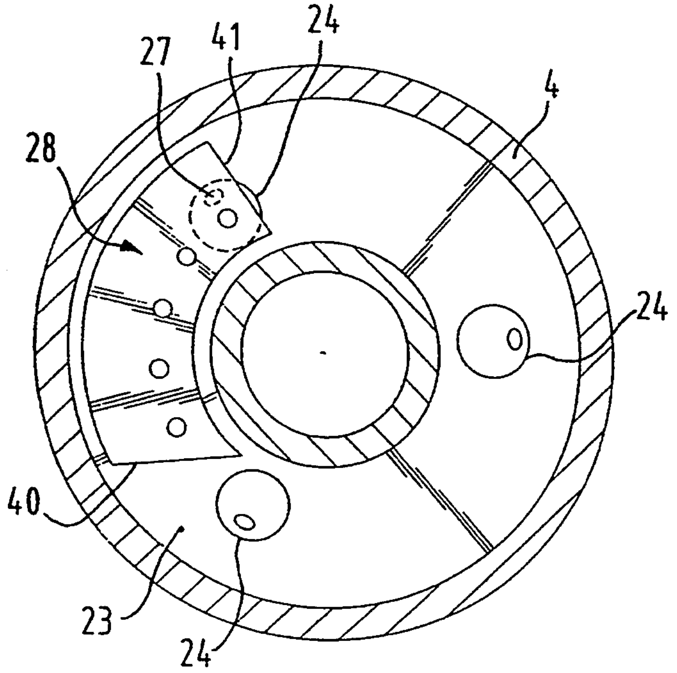
FIG. 2 is a section along the line II—II in FIG. 1, showing certain parts of the torque release mechanism in different positions.
Figure 3:
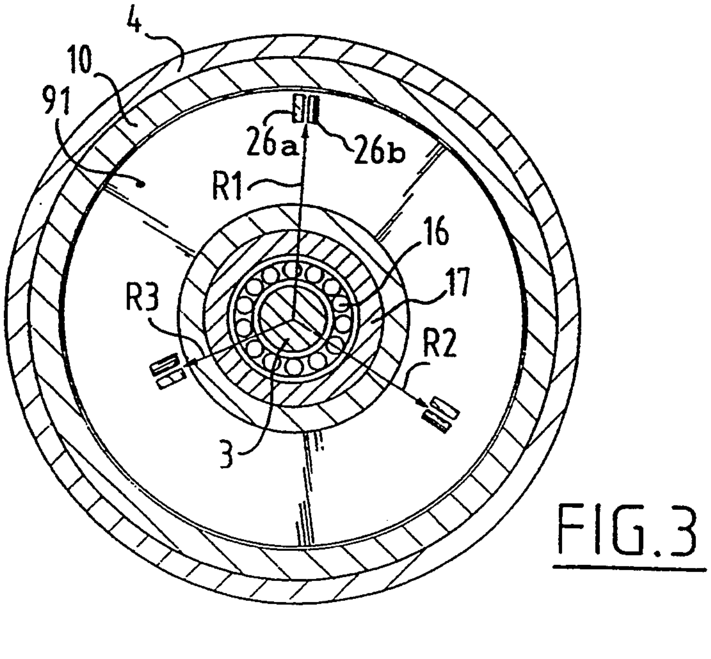
FIG. 3 shows a section along the line III—III in FIG. 1.

Col. 4, line 59, change "FIGs. 2a and b" to "FIG. 2".

Signed and Sealed this

Twenty-second Day of August, 1995

Attest:

Bruce Lehman

BRUCE LEHMAN

*Attesting Officer* *Commissioner of Patents and Trademarks*